United States Patent
Baur et al.

[19]

[11] Patent Number: 5,867,016
[45] Date of Patent: Feb. 2, 1999

[54] DUTY CYCLE BASED AC POWER CONTROL WITH REDUCED VOLTAGE FLUCTUATIONS

[75] Inventors: Bruce K. Baur, Milwaukie; John C. Dalrymple, Portland; Cory A. Westerlund, Wilsonville, all of Oreg.

[73] Assignee: Tektronix, Inc., Wilsonville, Oreg.

[21] Appl. No.: 936,978

[22] Filed: Sep. 25, 1997

[51] Int. Cl.[6] ................................................. H05B 37/02
[52] U.S. Cl. .......................................... 323/319; 323/322
[58] Field of Search ................................. 323/235, 237, 323/241, 244, 300, 319, 320, 322

[56] References Cited

U.S. PATENT DOCUMENTS

| | | | |
|---|---|---|---|
| 3,989,999 | 11/1976 | Thompson et al. | 323/211 |
| 4,047,097 | 9/1977 | Gyugyi et al. | 323/235 |
| 4,234,842 | 11/1980 | Brennen et al. | 323/210 |
| 4,531,086 | 7/1985 | Schmid et al. | 323/237 |
| 5,155,740 | 10/1992 | Ao et al. | 323/219 |
| 5,789,723 | 8/1998 | Hirst | 323/241 |
| 5,796,245 | 8/1998 | Beaulieu et al. | 323/322 |

*Primary Examiner*—Jeffrey Sterrett
*Attorney, Agent, or Firm*—Francis I. Gray; Ralph D'Alessandro

[57] ABSTRACT

A duty cycle based AC power control method reduces objectionable voltage fluctuations at a frequency that causes "flicker" by shifting the frequency of actuations of controlled devices to frequencies significantly greater than and/or less than the flicker sensitive frequency. The frequency of actuations may be redistributed (1) by segmenting the devices to provide approximately equal power requirements per actuation, (2) by providing one-half cycle actuation pulses rather than one cycle actuation pulses, and/or (3) by spacing the actuations evenly over a given time period and forcing the aggregate demand to follow a slowly rising/falling envelope. The result is the minimization of power distribution at the flicker frequency.

9 Claims, 3 Drawing Sheets

5,867,016

DUTY CYCLE BASED AC POWER CONTROL WITH REDUCED VOLTAGE FLUCTUATIONS

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to AC power control, and more particularly to duty cycle based AC power control with reduced voltage fluctuations in order to satisfy electrical equipment standards and eliminate noticeable "flicker" in other appliances when the electrical equipment imposes voltage fluctuations upon an AC power line.

IEC Standard 1000-3-3 specifies certain tests that electrical equipment connected to an AC line must pass in order to be sold in Europe. In general terms the Standard describes how voltage fluctuations imposed on the AC line by an appliance, due to time-varying power demand, must be limited so as to reduce effects on other devices connected to the line. The canonical example is the visible flickering of incandescent lamps caused by these voltage fluctuations. The Standard defines numerical methods to quantify this flickering, prescribes conditions under which it must be measured, and sets allowable limits for it.

Certain devices, such as phase change ink printers, require various internal subsystems to be maintained at specific values, such as for temperature control. This is done using closed-loop regulation with "continuously variable" load actuation. The continuously variable actuation is simulated by cycle dropping, for example, by connecting loads to the line for full cycles starting at line zero crossings. Cycle dropping also is used to compensate for line voltage so that a given load control loop's output signal values result in the same average power input to the load over the entire line voltage range. For example a load that draws three amperes at one hundred volts to produce 300 watts of power draws six amperes at two hundred volts to produce 1200 watts of power, so the load only needs to be activated one-quarter of the time for the same average power, which reduces the duty cycle in this case to 25% or one out of every four cycles. Also where the loads are of varying sizes and are independently actuated, the active (on) cycles of various heaters occur at random times with respect to each other and the power gets spread across the frequency spectrum like "white" noise. The result is that for multiple loads with multiple demands there can be an appreciable amount of power at the most sensitive "flicker" frequency of 8.8 Hz.

What is desired is a duty cycle based AC power control method with reduced voltage fluctuations that minimizes "flicker" in other devices coupled to the same line voltage.

BRIEF SUMMARY OF THE INVENTION

Accordingly the present invention provides a duty cycle based AC power control method with reduced voltage fluctuations by using one or more of the following techniques: (1) reducing the current pulses from fall cycle to half-cycle to increase the fundamental frequency of the pulse repetition for each controlled device, (2) restructuring the load varying controlled devices into smaller lumps, and/or (3) controlling how the load pulses are arranged to move the voltage fluctuations away from peak flicker sensitive frequencies. The load varying devices, such as heaters for a phase change ink printer, are segmented or repartitioned to reduce the amount of power per actuation. An interrupt is generated from the main power supply for each zero crossing, both negative and positive. A microprocessor, based upon the desired duty cycle for each device, the line voltage, and the zero crossings, fills a work buffer with actuation bits, each bit representing a different load device/segment. The actuation of the devices is reordered in descending order of power requirements, and then alternatively reversed in order, in order to provide a frequency spectrum for the voltage fluctuations that is concentrated at significantly greater than, or less than, the frequencies that produce noticeable "flicker". In other words the "carrier" represented by the aggregate frequency of actuation is significantly above the "flicker" frequency and is amplitude modulated by the power of each controlled device at the work buffer readout frequency, which is significantly below the "flicker" frequencies.

The objects, advantages and other novel features of the present invention are apparent from the following detailed description when read in conjunction with the appended claims and attached drawing.

DETAILED DESCRIPTION OF THE INVENTION

The basic concept of the present invention is to move the frequency of the total power spectrum for duty cycle pulses applied to multiple loads away from the most sensitive peak "flicker" frequency of 8.8 Hz to a "flicker" insensitive frequency, such as above 25 Hz or below 2 Hz. One way to increase the frequency is to split the large loads into smaller loads so that in order to provide the same power, there are more duty cycle pulses per unit of time thereby increasing the frequency of the total power spectrum.

Another technique is to provide half-cycle duty cycle pulses instead of full cycle duty cycle pulses, requiring twice as many duty cycle pulses for the same total power per unit of time. Again this increases the frequency of the total power spectrum.

However, either one or both of these techniques may not totally alleviate the "flicker" problem, as the independent cycling of the loads through intermodulation creates a "white" noise across the power spectrum so that there may still be appreciable power at the "flicker" sensitive frequency of 8.8 Hz. A third technique that is useful in eliminating the "white" noise effect is to combine the duty cycle pulses in such a way that they are evenly spaced and ordered so as to provide a relatively constant fundamental frequency for the total power spectrum with either no or a very low frequency modulation so that the power is spectrally grouped closely about the fundamental frequency (and about d.c.) with little spreading into the 8.8 Hz region.

Figure 1:
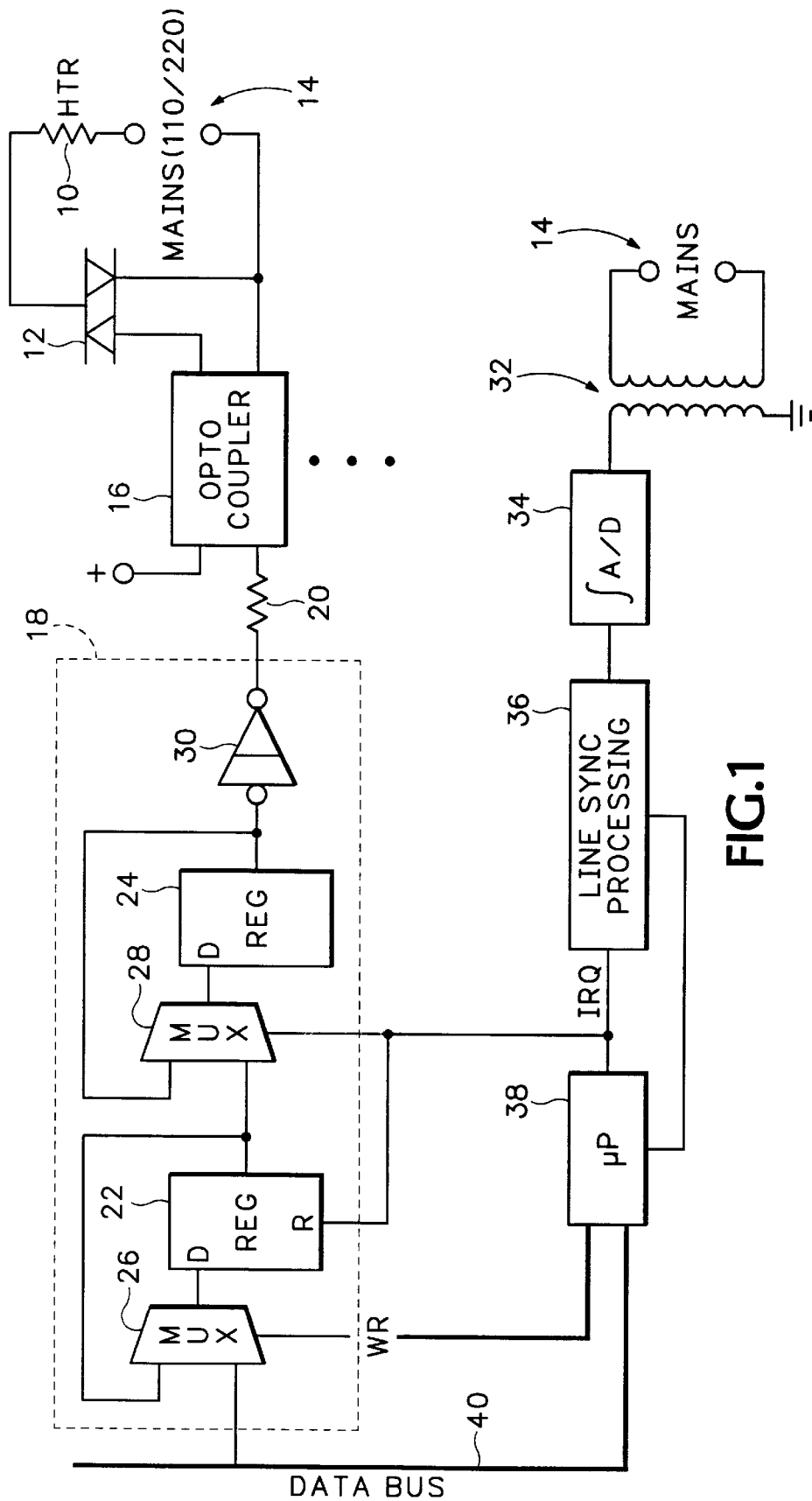
FIG. 1 is a block diagram view of a system subject to duty cycle based AC power control according to the present invention.

Referring now to FIG. 1 a continuously variable actuation device 10, such as a heater segment for a phase change ink-jet printer, and a switch 12, such as a triac switch, are coupled across an AC line 14. A control signal is applied via an opto-coupler 16 to the switch 12 to intermittently couple the device 10 to the AC line 14. A control signal generator 18 is coupled to the opto-coupler 16 via a resistor 20.

The control signal generator 18, for example, has a pair of registers 22, 24, a pair of multiplexers 26, 28, and an output buffer amplifier 30. The first multiplexer 26 is coupled to a data bus to receive a one-bit input value. The output from the first multiplexer 26 is coupled to the input of the first register 22. A write signal acts as a control signal for the first multiplexer 26 to write the one-bit input into the first register 22. The output from the first register 22 is input to the second multiplexer 28 together with the output from the second register 24. The output of the second multiplexer 28 is applied as the input to the second register 24. The output from the second register 24 is applied via the buffer amplifier 30 as the control signal for the opto-coupler 16. The second multiplexer 28 is controlled by an interrupt signal, which interrupt signal also is used to reset the first register 22.

Figure 2:
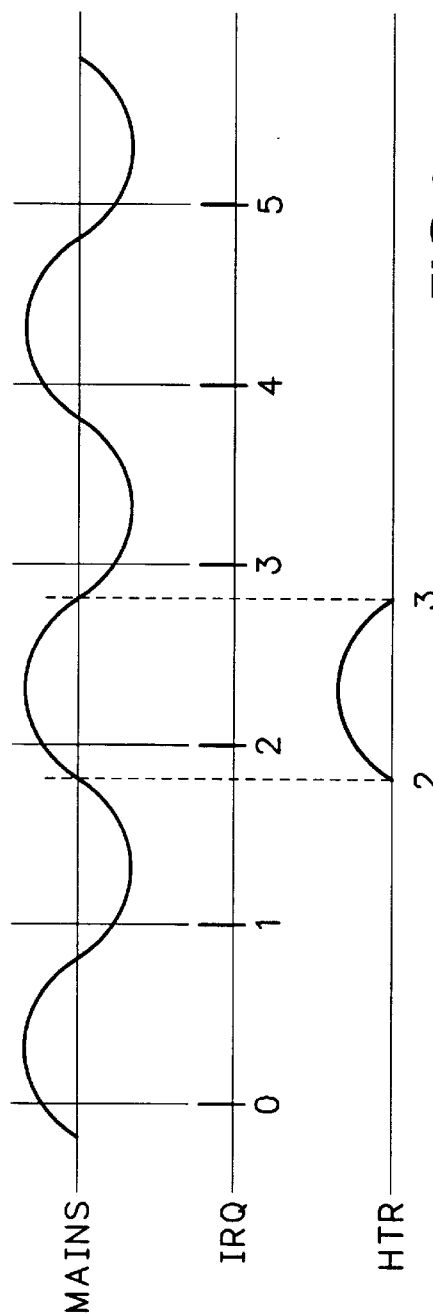
FIG. 2 is a timing diagram for the system of FIG. 1 illustrating halfcycle actuation of a load varying device according to the present invention.

The AC line 14 also is coupled via a step-down transformer 32 to an integrating analog to digital converter 34. The output of the integrating A/D 34 is in the form of a series of pulses having a pulse density that is a function of the amplitude of the signal input to the A/D. The pulse signal from the A/D 34 is input to a line sync processing circuit 36 that generates a hardware interrupt as the interrrupt signal, IRQ, at a fixed interval relative to every zero crossing of the power signal on the AC line 14, as shown in FIG. 2. The interval is determined by the processing time of the remainder of the circuit so that the device 10 is connected to and disconnected from the AC line 14 at zero crossing times. The interrupt signal also is input to a microprocessor 38 that generates the data words for distribution over a data bus 40 as well as write commands for the first multiplexer 22 for each controlled device 10. The interrupt signal may be generated for every zero crossing, only the positive zero crossings or only the negative zero crossings.

Figure 3:
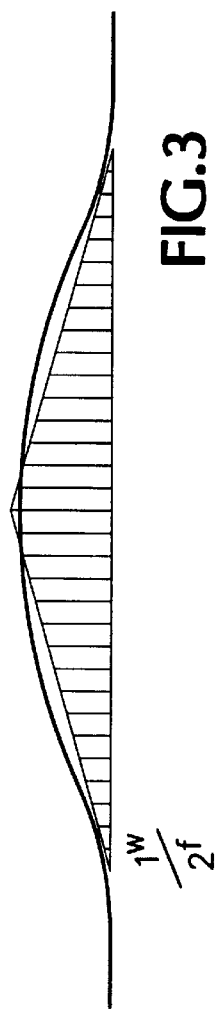
FIG. 3 is a timing diagram for the system of FIG. 1 illustrating the pulse frequency as reordered to provide flicker free operation according to the present invention.
Figure 4:
FIG. 4 is a spectrum diagram illustrating the frequency spectrum for the signal of FIG. 3 according to the present invention.

At the conditions under which flicker must be measured the frequency content of the voltage disturbance resulting from the current pulse stream needs to be kept away from the 8.8 Hz peak of the flicker sensitivity curve shown in the IEC Standard 1000-3-3. It is desirable to size the current pulses and power demands so that the fundamental frequency of the pulse stream is above 25 Hz where flicker sensitivity is essentially zero. At least the fundamental frequency of the pulse stream should be as far from 8.8 Hz as is practical so its harmonics are close to or above 25 Hz. The algorithm implemented by the microprocessor 38 reorders the individual heater actuation pulses so as to provide an aggregate power demand envelope or "power wave" that conceptually amplitude modulates the pulse stream fundamental frequency. This power wave follows a smoothly rising and falling shape versus time configuration, as shown in FIG. 3. Since the power wave amplitudemodulates the pulse stream, modulation theory describes the frequency content of the current demand and resulting voltage fluctuations that cause the flicker effect. If the pulse steam fundamental frequency is enough above 8.8 Hz, then the pulse stream's harmonics are above the sensitive range and only the zero-order (sideband of d.c.) and first-order (sidebands around the fundamental frequency) modulation products are significant. By forcing the modulating waveshape to have most of its energy concentrated at low frequencies due to the alternately rising/falling shape, these modulation products are clustered around d.c. and the pulse stream fundamental frequency, and thus kept away from the sensitive frequency region for flicker, as shown in FIG. 4.

Figure 5:
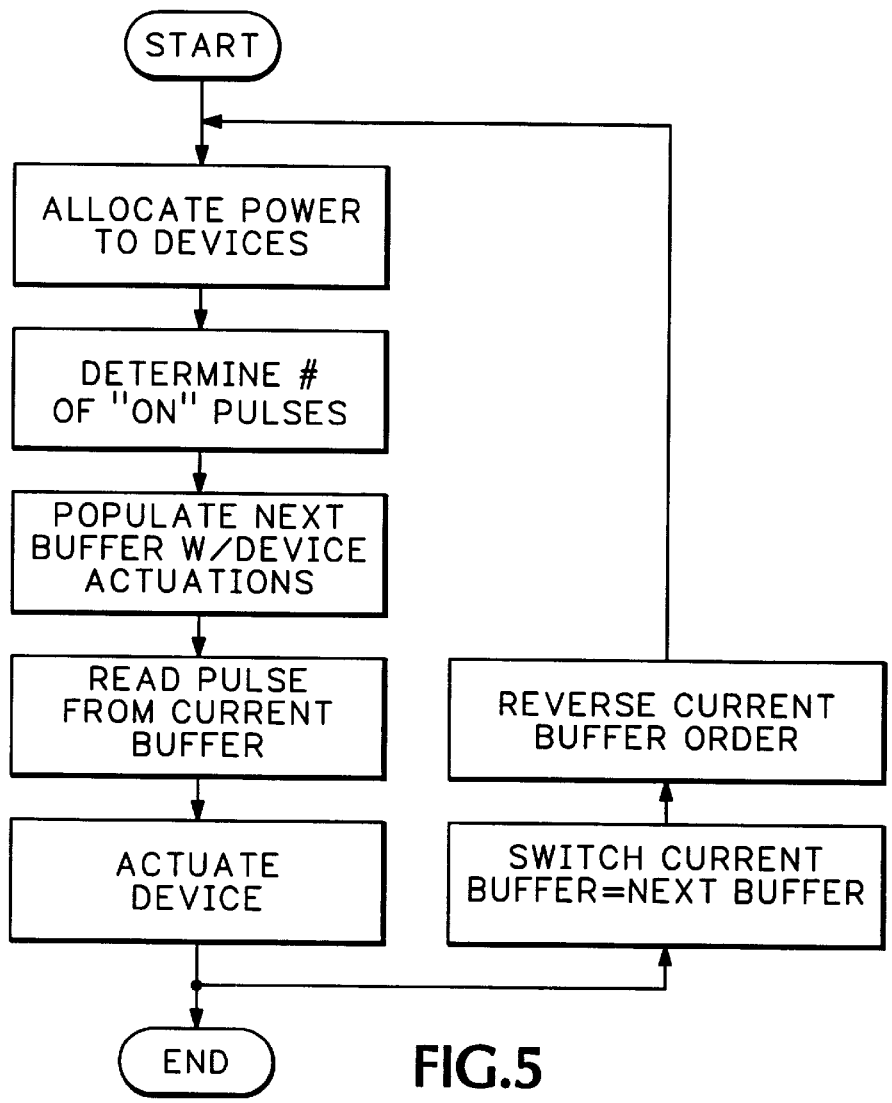
FIG. 5 is a flow chart view of a flicker control system for the system of FIG. 1 according to the present invention.
Figure 6:
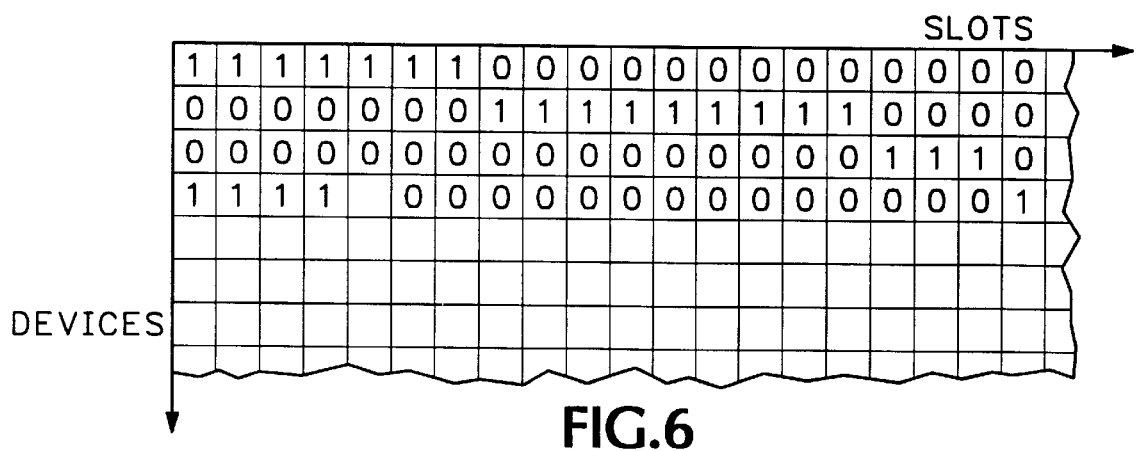
FIG. 6 is a graphic representation of a work buffer for storing actuation commands according to the present invention.

The microprocessor 38 populates one work buffer with heater actuation bits while another is coupled to the data bus 40 so that one work buffer is used to control the heaters 10 while the other is being filled. As shown in FIG. 5 the available power is allocated to the heaters 10 by the processor 38 in macro priority order, limiting the demand, if necessary, so that total demand does not exceed the available power. Macro priority is a priority assigned based upon which heaters 10 are desired to be actuated (heat) first. The amount of power each heater needs is a function of the number of heater segments and the watts required per segment. Then the number of "on" pulses, or actuation bits, is determined that needs to be placed in the filling work buffer. The number of pulses is based on the percent power at 100 volts requested for the heater, the line voltage and how many segments there are for the heater. The work buffer is then populated with the heater segment actuations, with the pulses for the largest heater being placed first so that when all the pulses are placed, the buffer is sorted in descending order. Referring to FIG. 6 the buffer has a number of slots per unit interval, such as 100 slots for a one second interval. The devices are loaded with the number of pulses required for that interval to provide the required power. As shown device A has seven slots allocated, device B has nine slots allocated, device C has three slots allocated, etc. For each clock cycle one column of the buffer is read out per clock cycle. More than one device may be activated per clock cycle where there are fewer slots in the buffer than devices to be actuated over the unit interval. In that case, as shown, the overage of pulses is placed starting at the beginning of the buffer. The pulses also are spaced using the Bresenham algorithm on readout so that, if there are less pulses than buffer slots, the empty slots in the buffer are evenly spaced so that the fundamental or "carrier" has little or no frequency modulation. As an example if only 25 slots are filled, the pulses are spaced four slots apart. Every time a new buffer is started, the readout order is reversed to provide alternately a descending and an ascending order, giving the desired wave pattern as shown in FIG. 3. This provides the carrier frequency output of 25 Hz while providing a modulating signal with a fundamental frequency of approximately 0.5 Hz.

Thus the present invention provides a duty cycle based AC power control system with reduced voltage fluctuations to satisfy equipment electrical standards by reducing the size of the devices being actuated, such as by segmentation, so that more actuation pulses are required, by actuating the devices on half cycles of the main power supply rather than full cycles, also increasing the number of actuations per unit time, and by controlling the timing of the actuations so that the frequency spectrum of the actuations is concentrated in regions significantly away from the sensitive "flicker" frequency of 8.8 Hz.

We claim:

1. A duty cycle based apparatus for minimizing the effect of voltage fluctuations from continuously variable actuation devices upon an AC line, each device having at least one segment with the segments being actuated by duty cycle pulses, comprising:

means for storing actuation commands for the segments; and means for actuating the segments with duty cycle pulses according to the stored actuation commands so as to move a frequency of a total power spectrum for the duty cycle pulses to an aggregate pulse repetition carrier frequency that is significantly above a flicker frequency.

2. The apparatus as recited in claim 1 wherein the number of segments is increased by subdividing segments that require significantly more power than other segments so as to provide a more nearly equal power requirement for each segment per actuation and, thus, increasing the number of actuations per unit of time to generate the carrier frequency.

3. The apparatus as recited in claim 1 wherein an actuation duration for each segment is decreased per duty cycle pulse by generating one-half cycle current pulses synchronized with the AC line for each segment and, thus, increasing the number of actuations per unit of time to generate the carrier frequency.

4. The apparatus as recited in claim 1 wherein the duty cycle pulses for the segments are distributed evenly over a given time interval to provide the carrier frequency and in order as a function of amplitude to provide a low frequency modulation of the carrier frequency.

5. The apparatus as recited in claim 1 wherein the actuating means comprises:

means for generating an interrupt signal related to zero crossings of the AC line;

means for filling the storing means for a given unit of time in order of a power rating for each segment indicating the number of actuations for each segment required during the given unit of time; and means for reading out the storing means as a function of the interrupt signal over the given unit of time as the actuation commands such that the duty cycle pulses are distributed evenly over the given unit of time to provide the carrier frequency.

6. A method of actuating devices so as to minimize power contribution at a flicker frequency comprising the steps of:

generating an interrupt signal with a given relationship to zero crossings of an AC power line; and actuating the devices in segments of approximately equal power requirements in response to the interrupt signal to increase the number of actuations per unit time to provide an actuation frequency significantly above the flicker frequency.

7. The method as recited in claim 6 further comprising the step of actuating the devices for one-half cycle periods rather than one cycle periods to further increase the number of actuations per unit time to provide the actuation frequency.

8. The method as recited in claim 7 further comprising the steps of:

loading a buffer in order of power requirements with actuation pulses for each device; and actuating the devices at evenly spaced increments within the unit time from the buffer actuation pulses.

9. A method of minimizing power distribution at a given frequency when a plurality of devices are actuated over a given unit of time comprising the steps of:

increasing the number of actuations by segmenting the plurality of devices to equalize the power required per actuation;

distributing the actuations evenly over a given unit of time in order of power requirements; and ordering the actuations in time so that the aggregate demand follows a smoothly rising and falling envelope at a frequency below the given frequency;

whereby the actuations produce a carrier frequency significantly above the given frequency with the carrier frequency having a low frequency modulation such that minimum power is distributed at the given frequency.

* * * * *

UNITED STATES PATENT AND TRADEMARK OFFICE
CERTIFICATE OF CORRECTION

PATENT NO. : 5,867,016
DATED : February 2, 1999
INVENTOR(S) : Bruce K. Baur, et al.

It is certified that error appears in the above-identified patent and that said Letters Patent is hereby corrected as shown below:

Column 1, line 64, after "from" and before "cycle" delete "fall" and insert --full--.

Signed and Sealed this

Seventeenth Day of August, 1999

Attest:

Q. TODD DICKINSON

*Attesting Officer*  *Acting Commissioner of Patents and Trademarks*